April 14, 1959   G. DE STEVENS   2,882,160
SENSITIZING DYES FROM 2-METHYL-5,6-DIHYDRO-4-CYCLOPENTATHIAZOLES
Filed May 10, 1955

FIG. 1.
[BIS-2-(3-METHYL-5,6-DIHYDRO-4-CYCLOPENTATHIAZOLE)]
[2,β'-DIMETHINE-2'-(3'-METHYL-5',6'-DIHYDRO-4'-CYCLOPENTATHIAZOLE)]
TRIMETHINE CYANINE DIIODIDE

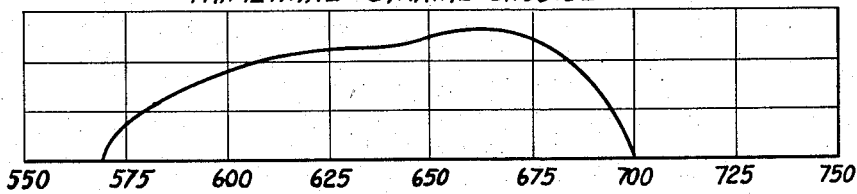

FIG. 2.
3,3'- DIMETHYL - 5'-6'-DIHYDRO- 4'-
CYCLOPENTAOXATHIAZOLOCARBOCYANINE IODIDE

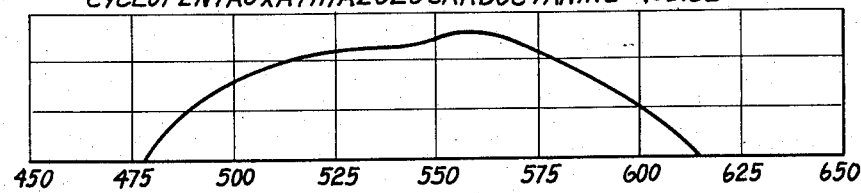

FIG. 3.
1',3-DIETHYL-5,6-DIHYDRO-4-CYCLOPENTATHIAZOLO-
2'- CYANINE IODIDE

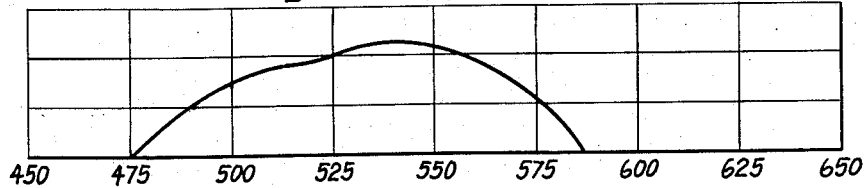

FIG. 4.
3- ETHYL - 5-[(3-ETHYL-5,6-DIHYDRO-4-CYCLOPENTA-
2(3) THIAZOLYLIDENE) ETHYLIDENE] RHODANINE

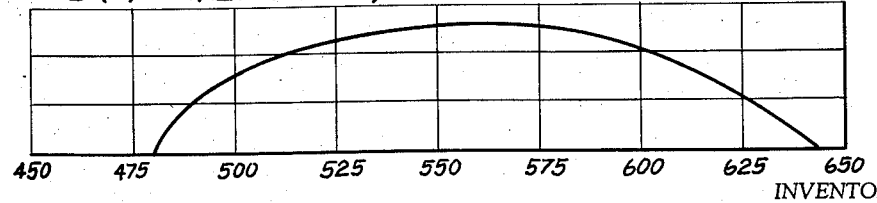

INVENTOR.
GEORGE de STEVENS
BY Isidore Match

ATTORNEY

2,882,160
SENSITIZING DYES FROM 2-METHYL-5,6-DIHYDRO-4-CYCLOPENTATHIAZOLES

George De Stevens, Portland, Conn., assignor to Sperry Rand Corporation, a corporation of Delaware Application May 10, 1955, Serial No. 507,457

11 Claims. (Cl. 96—105)

This invention relates to new compositions of matter, particularly useful as sensitizing dyes in photographic processes, and to processes for preparing the same.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

I have now found that it is possible to prepare cyanine dyes in which one or both of the above mentioned auxochromic nitrogen atoms lie in a 5,6-dihydro-4-cyclopentathiazole nucleus. I have further found that these new cyanine dyes sensitize photographic emulsions strongly and cleanly, i.e. without producing excessive fog or residual dye stain.

It is accordingly an object of my invention to provide new cyanine dyes. A further object is to provide photographic emulsions sensitized with such dyes. Other objects will appear hereinafter.

As starting material for the preparation of new dyes I employ 2-alkyl-5,6-dihydro-4-cyclopentathiazoles, particularly 2-methyl-5,6-dihydro 4-cyclopentathiazole. (Erlenmeyer, Helv. Chim. Acts., 29, 280 (1946).)

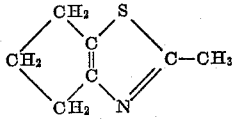

I first convert these alkyl-5,6-dihydro-4-cyclopentathiazole bases to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

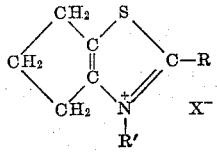

wherein R' represents an alkyl group, e.g. methyl, ethyl, n-propyl, isobutyl, n-butyl, β-hydroxyethyl, β-methoxyethyl, α-ethoxyethyl, β-acetoxyethyl, β-carboxyethyl, carboxymethyl, β-carbomethoxyethyl, β-carbethoxyethyl, allyl, etc. or an aralkyl group, e. g. benzyl, phenyl, ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate perchlorate, acetate, etc.

To prepare pseudocyanine dyes from such quaternary salts I react the quaternary salts with α-halogenoquinoline quaternary salts, in the presence of an acid binding agent, such for example, as sodium ethylate, sodium carbonate, pyridine or a strong organic base (e.g. tri-ethyl amine, tri-methylamine and N-methyl piperidine). I have found it advantageous to employ a mixture of pyridine with a strong tertiary organic base.

Instead of 2-halogenoquinoline quaternary salts I can employ 2-alkyl mercapto or 2-aryl mercaptoquinoline quaternary salts to condense with the quaternary salts of 2-alkyl-5,6-dihydro-4-cyclopentathiazole in the presence of an acid binding agent.

Using 2-halogenopyridine quaternary salts instead of 2-halogenoquinoline quaternary salts I can prepare pyridocyanine dyes containing a 5,6-dihydro-4-cyclopentathiazole nucleus.

Using 2-alkyl mercapto or 2-aryl mercaptobenzothiazole or naphthothiazole salts I can prepare simple cyanine dyes other than pseudocyanine dyes.

To prepare symmetrical carbocyanine dyes from 2-alkyl-5,6-dihydro-4-cyclopentathiazole quaternary salts, I react the quaternary salts with esters of ortho acids, e.g. ethyl orthoformate, ethyl orthoacetate, ethyl orthopropionate and ethyl orthobenzoate in the presence of pyridine or a mixture of pyridine and triethyl amine.

To prepare unsymmetrical carbocyanine dyes from 2-alkyl-5,6-dihydro-4-cyclopentathiazole quaternary salts I react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethyl amine.

To prepare dicarbocyanine dyes from 2-alkyl-5,6-dihydro-4-cyclopentathiazole quaternary salts I react the quaternary salts with cycloammonium quaternary salts containing an ω-aryl aminobutadienyl group in alpha or gamma position in the presence of an acid binding agent, e.g. triethylamine in pyridine.

To prepare styryl dyes from my new quaternary salts I condense them with p-dialkyl aminobenzaldehyde in the presence of an alkaline catalyst, e.g. piperidine in absolute ethanol solution.

To prepare merocarbocyanine dyes from 2-alkyl-5,6-dihydro-4-cyclopentathiazole quaternary salts, I condense the quaternary salts with ketomethylene heterocyclic intermediates containing an aryl aminomethylene group in the 5-position in the presence of an acid binding agent, e.g. pyridine plus triethyl amine. Examples of such ketomethylene intermediates are 5-acetanilidomethylene-3-ethyl rhodanine, 5-acetanilidomethylene-3-ethyl-1-phenyl-2-thiohydantoin, etc.

To sensitize photographic silver halide emulsions with my new dyes, I disperse the dyes in the emulsions. My invention is particularly directed to the customarily employed gelatino-silver-halide emulsion, such as the gelatino-silver-bromide, bromiodide, chloride and chlorobromide for example. The methods of incorporating dyes in emulsions are simple and well known to those skilled in the art and described in various patents and publications, for example, U.S. Patent 2,336,843, patented December 14, 1943.

It is well known that cyanine dyes resonate between two extreme forms and that a cyanine dye can be represented by either of the two extreme forms. Thus, the unsymmetrical type of instant dyes can be represented by either of the following formulas:

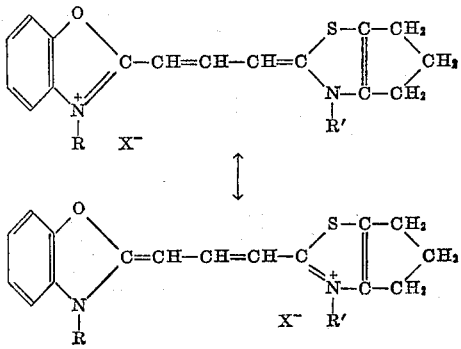

Although the hereinabove set forth alkyl-5,6-dihydro-4-cyclopentathiazole base has been previously known, the quaternary salts and the dyes prepared therefrom are believed to be new.

My dyes have been found to be powerful photographic sensitizers and are of value for use in photographic emulsions.

The following examples will serve to illustrate my invention and the method of preparation of the dyes.

*Example 1.—2-methyl-5,6-dihydro-4-cyclopentathiazole methiodide*

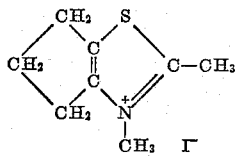

37.5 g. (1 mol) of 2-methyl-5,6-dihydro-4-cyclopentathiazole and 42.2 g. (1 mol plus 10% excess) of methyl iodide were heated in a sealed tube at 100° for eight hours. On cooling, the semi-solid cake was triturated first with ether and then with acetone. The light tan residue was filtered off, washed with acetone and dried in a desiccator. Yield: 52 g., 69%, M.P. 105°.

*Example 2.—2-methyl-5,6-dihydro-4-cyclopentathiazole ethiodide*

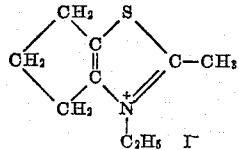

37.5 g. (1 mol) of 2-methyl-5,6-dihydro-4-cyclopentathiazole and 45 g. (1 mol plus 10% excess) of ethyl iodide were heated in a sealed tube at 100° for eight hours. On cooling, the solid cake was triturated first with ether and then with acetone. The light tan residue was filtered off and washed with acetone. After drying in a desiccator, the yield of dry quaternary salt was 72.5 g. (86%), M.P. 116°.

*Example 3.—[Bis-2-(3-methyl-5,6-dihydro-4-cyplopentathiazole)][α,β' - dimethine - 2' - (3' - methyl - 5',6'-dihydro-4'-cyclopentathiazole)] trimethine cyanine diiodide*

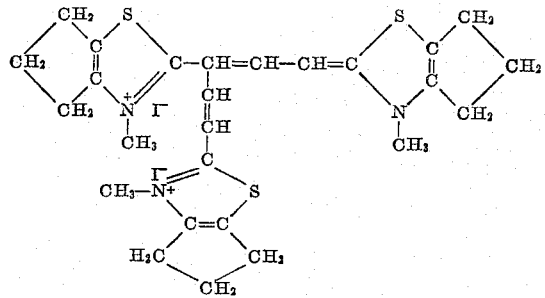

5.6 g. (1 mol) of 2-methyl-5,6-dihydro-4-cyclopentathiazole methiodide, 8.8 g. (3 mol) of ethyl orthoformate, and 15 cc. of pyridine were refluxed for four hours. On cooling, small green crystals were obtained which were filtered off and washed successively with water and acetone and dried in vacuo. In this manner 0.9 g. (10.1%) of crude dye was obtained. The dye, after two recrystallizations from methyl alcohol (200 cc. per gram) was obtained in 3.42% yield, as minute green crystals melting at 264° with decomposition. A solution of the dye in methyl alcohol is blue with an absorption maximum at 620 mu. This dye is a moderate sensitizer to 700 mu with a maximum at 665 mu.

*Example 4.—3,3' - diethyl - 5,6,5',6' - tetrahydro - 4,4'-cyclopentathiazolocarbocyanine iodide*

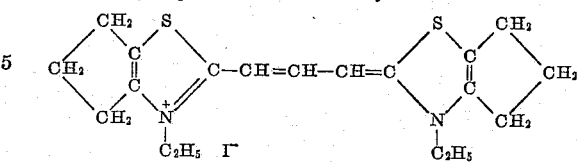

5.9 g. (1 mol) of 2-methyl-5,6-dihydro-4-cyclopentathiazole ethiodide, 8.8 g. (3 mol) of ethyl orthoformate and 15 cc. of pyridine were refluxed for four hours. At the end of this time, the reaction mixture was cooled and 300 cc. of diethyl ether was added to the reaction mixture. A viscous residue was obtained which, after repeated washing with ether, gave rise to a reddish blue crystalline material. The dye was collected on a Büchner funnel, washed successively with water and acetone, and dried in vacuo. The yield of crude dye was 0.8 g. (8.5%). After two recrystallizations from methyl alcohol (150 cc. per gram of dye) very dark tiny crystals were obtained in 3.2% yield, melting at 258°–260° with decomposition. A solution of the dye in methyl alcohol is reddish blue with an absorption maximum at 580 mu.

*Example 5.—3,3' - dimethyl - 5' - 6' - dihydro - 4' - cyclopenta oxathiazolocarbocyanine iodide*

Calc. for $C_{18}C_{19}N_2SOI$: C, 49.31; H, 4.37; I, 28.96
Found: C, 49.59; H, 4.57; I, 28.57

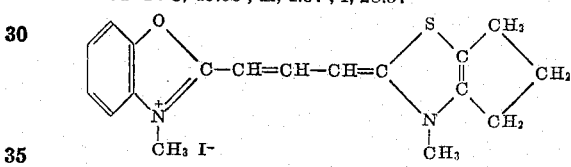

4.16 g. (1 mol) of 2-β-acetanilidovinyl benzoxazole methiodide, 2.81 g. (1 mol) of 2-methyl-5,6-dihydro-4-cyclopentathiazole methiodide were dissolved in 20 cc. of absolute ethyl alcohol under reflux. To this solution was added 2.0 g. (2 mol) of triethylamine. Boiling was continued for twenty minutes during which time a dull red precipitate was obtained. On cooling, the dye was filtered off, washed successively with water and acetone, and dried in vacuo. In this manner, 3.6 g. (85%) of the crude dye was obtained. The dye was recrystallized twice fom methyl alcohol (100 cc. per gram of dye). Yield: 2.6 g. (61.5%). The pure dye was obtained in the form of fine red needles with a blue reflex and melting at 272° with decomposition. A solution of the dye in methyl alcohol is reddish orange with an absorption maximum at 516 mu. This dye is a powerful sensitizer to 615 mu with a maximum at 560 mu.

*Example 6.—1',3 - diethyl - 5,6 - dihydro - 4 - cyclopentathiazolo-2'-cyanine iodide*

Calc'd for $C_{20}H_{23}N_2ST$: C, 53.31; H, 5.15; I, 28.19; N, 6.22; S, 7.11
Found: C, 53.45; H, 5.18; I, 28.53; N, 6.43; S, 7.07

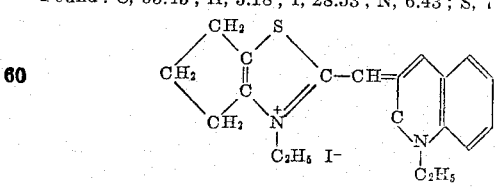

2.95 g. (1 mol) of 2-methyl-5,6-dihydro-4-cyclopentathiazole ethiodide, 4.1 g. (1 mol) of 2-iodoquinoline ethiodide were dissolved in 20 cc. of boiling absolute ethyl alcohol under reflux. To the resulting solution was added 2 g. (2 mol) of triethylamine with constant agitation of the reaction mixture while refluxing was maintained for 1½ hours. On cooling to 0°, a bright orange red precipitate was obtained which was collected on a filter, washed with acetone and then water, and finally dried in vacuo. In this manner, 4.2 g. (93.5%) of crude dye was obtained. The dye was recrystallized twice from methyl alcohol (150 cc. per gram of dye) and a 58% yield of pure dye was obtained in the form of reddish orange needles and melting at 284° d. A methyl alcohol solution of the dye had an absorption maximum at 490 mu. This dye is a strong sensitizer to 585 mu with a maximum at 540 mu.

*Example 7.—2-p-dimethylaminostyryl-5,6-dihydro-4-cyclopentathiazole methiodide*

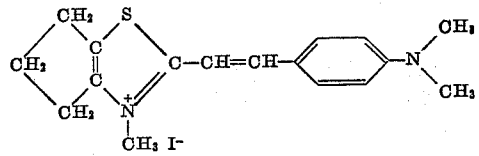

2.81 g. (1 mol) of 2-methyl-5,6-dihydro-4-cyclopentathiazole methiodide and 1.49 g. (1 mol) of p-dimethylaminobenzaldehyde were dissolved in 15 cc. of boiling absolute ethyl alcohol under reflux. To the resulting solution was added a few drops of piperidine and the reaction mixture was refluxed for 1½ hours. On cooling to 0° overnight, a viscous residue was obtained which was triturated with a small amount of acetone and cooled to 0° for 3 hours. The reddish blue crystals which were formed were filtered off, washed successively with water and acetone and dried in vacuo. The yield of crude dye was 1.2 g. (29.2%). The dye, after recrystallization from methyl alcohol (60 cc. per gram of dye) was obtained in the form of dark red needles with a blue reflux, melting at 267° with decomposition. A methyl alcohol solution of the dye had an absorption maximum at 470 mu.

*Example 8.—3-ethyl-5-[(3-ethyl-5,6 - dihydro - 4 - cyclopenta-2(3)thiazolylidene)ethylidene]rhodanine*

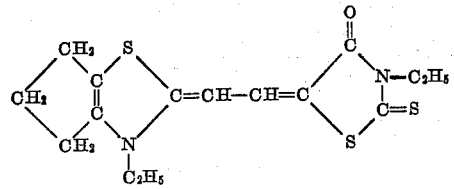

2.95 g. (1 mol) of 2-methyl-5,6-dihydro-4-cyclopentathiazole ethiodide and 3.06 g. (1 mol) of 5-acetanilidomethylene-3-ethyl rhodanine were dissolved in 15 cc. of absolute ethyl alcohol under reflux. To this solution was added 2 g. (2 mol) of triethylamine and the whole was refluxed for 20 minutes. On cooling, the precipitated dye was collected on a filter, washed successively with water and acetone and dried in vacuo. The yield of crude dye was 2.6 g. (77%). The dye was purified by dissolving in boiling pyridine and precipitating by the addition of methyl alcohol. The pure dye was obtained in the form of minute steel blue needles in a 69% yield, melting at 233° with decomposition. A methyl alcohol solution of the dye had an absorption maximum at 556 mu.

*Example 9.—1,3,3,3'-tetramethyl-5',6'-dihydro-4' - cyclopentapseudoindolothiazole carbocyanine iodide*

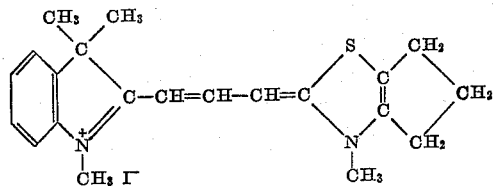

2.6 g. (1 mol) of 1,3,3-trimethyl-2-formylmethylene indolenine, 2.8 g. (1 mol) of 2-methyl-5,6-dihydro-4-cyclopentathiazole methiodide and 15 ml. of acetic anhydride were refluxed for 30 minutes. On cooling overnight, tiny green crystals were formed which were collected on a filter, washed well with water, then acetone and dried in vacuo. In this manner, 3.3 g. (72%) of crude dye was obtained. After two recrystallizations from methyl alcohol (25 ml. per gram) the yield of pure dye in the form of green needles was 52%, melting at 236°–238° d. A solution of the dye in methyl alcohol was reddish orange with maximum absorption at 524 mu.

*Example 10.—3,3'-diethyl-5',6'-dihydro-4'-cyclopentaoxathiazolo carbocyanine iodide*

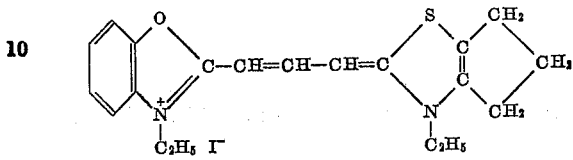

4.34 g. (1 mol) of 2-β-acetanilidovinyl benzoxazole ethiodide and 2.95 g. (1 mol) of 2-methyl-5,6-dihydro-4-cyclopentathiazole ethiodide were dissolved in 20 ml. of boiling absolute ethyl alcohol. To this solution there was added 2 g. (2 mol) of triethylamine. Refluxing was continued for 20 minutes during which time a dull red precipitate was obtained. On cooling, the dye was filtered off, washed successively with water and acetone and dried in vacuo. The dye was recrystallized twice from methyl alcohol (75 ml. per gram). Yield: 3.1 g. (67%). The pure dye was obtained in the form of blue crystals with a metallic reflex and melting at 249°–250° with decomposition. A solution of the dye in methyl alcohol is reddish orange with an absorption maximum at 516 mu. This dye is a powerful sensitizer to 615 mu with a maximum at 560 mu.

*Example 11.—3,3'-diethyl-5',6'-dihydro-4'-cyclopentaoxathiazolo dicarbocyanine iodide*

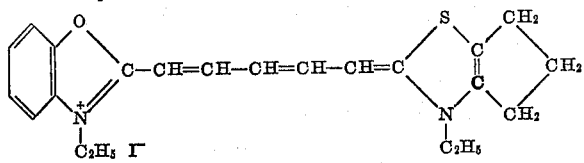

4.6 g. (1 mol) of 2-(4-acetanilido-1,3-butadienyl) benzoxazole ethiodide and 2.95 g. (1 mol) of 2-methyl-5,6-dihydro-4-cyclopentathiazole ethiodide were dissolved in boiling absolute ethyl alcohol. To this solution was added 2 g. (2 mol) of triethylamine. Refluxing was continued for 10 minutes. On cooling, the dye was collected on a filter, washed well with water, then acetone and air dried. In this manner, 18% yield of crude dye was obtained, which after two recrystallizations from methyl alcohol (50 ml. per gram), 0.5 g. (11%) of green needles with a golden reflux, M.P. 216° d., was obtained. A solution of the dye in methyl alcohol was blue with a maximum absorption at 610 mu.

*Example 12.—3,3'-diethyl-5',6'-dihydro-4'-cyclopenta-9-methyl thiathiazolocarbocyanine iodide*

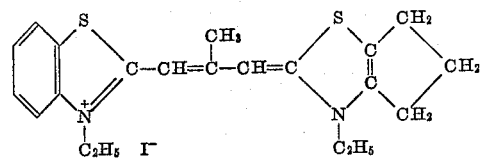

2.21 g. (1 mol) of 2-(2-methylmercaptopropenyl) benzothiazole ethyo-p-toluene sulfonate, 1.4 g. (1 mol) of 2-methyl-5,6-dihydro-4-cyclopentathiazole ethiodide, 1 g. (2 mol) of triethylamine and 15 ml. of absolute ethyl alcohol were refluxed for 15 minutes. After chilling overnight, the precipitate was collected on a filter, washed well with water, then acetone and dried in vacuo. In this manner, the yield of crude dye was 24%. After two recrystallizations from methyl alcohol (100 ml. per gram) 0.4 g. (16%) of pure dye was obtained, M.P. 278°–280° with decomposition. A solution of the dye in methyl alcohol was reddish purple with an absorption maximum at 540 mu.

The following dyes were prepared in a manner analogous to Example 10.

*Example 13.—3,3' - dimethyl - 5 - chloro-5',6'-dihydro-4'-cyclopentaoxathiazolo carbocyanine iodide*

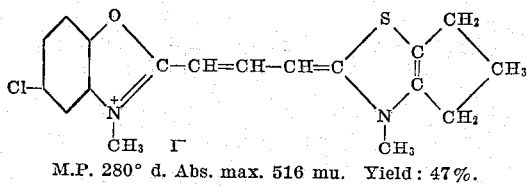

M.P. 280° d. Abs. max. 516 mu. Yield: 47%.

*Example 14.—3,3' - dimethyl - 5 - phenyl-5',6'-dihydro-4'-cyclopentaoxathiazolo carbocyanine iodide*

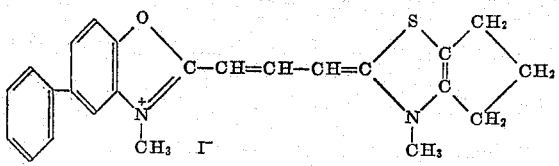

M.P. 259° d. Abs. max. 520 mu. Yield: 29%.

*Example 15.—3,3',5,6 - tetramethyl - 5',6' - dihydro - 4'-cyclopentaoxathiazolo carbocyanine iodide*

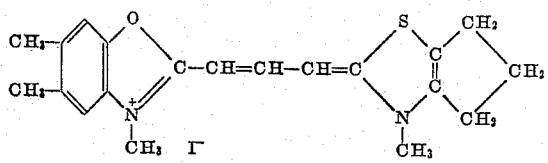

M.P. 283° d. Abs. max. 530 mu. Yield: 70%.

*Example 16.—[3-ethyl -2- (5,6-dihydro-4-cyclopentathiazole)] [1-phenyl-2,5-dimethyl-3-pyrrole] dimethine cyanine iodide*

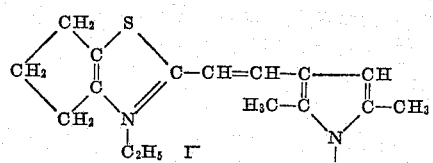

1.99 g. (0.01 mol) of 1-phenyl-2,5-dimethyl-3-pyrrole aldehyde, 2.95 g. (0.01 mol) of 2-methyl-5,6-dihydro-4-cyclopentathiazole ethiodide, 15 cc. of absolute ethyl alcohol and 2 drops of piperidine were refluxed for 15 minutes. After chilling overnight, the dye precipitate was collected on a filter, washed well with water, then acetone and air dried. After two recrystallizations from methanol (50 cc. per gram) a 23% yield of pure dye in the form of orange crystals, M.P. 273°–274° d., was obtained. A methanol solution of the dye gave a yellow color with an absorption maximum at 440 mu. The accompanying drawing is by way of illustration and depicts the sensitivity of photographic emulsions containing four of my new dyes. Each figure of the drawing is a diagrammatic reproduction of a spectrogram showing the sensitivity of the emulsion. The emulsions employed in these illustrations were prepared by incorporating these new dyes in emulsions in accordance with the method set forth in the hereinabove mentioned U.S. Patent No. 2,336,843, patented December 14, 1943. In Fig. 1 the curve depicts the sensitivity of the emulsion containing [Bis-2-(3-methyl-5,6-dihydro-4-cyclopentathiazole)] [2,β'-dimethine-2'-(3'-methyl-5',6'-dihydro-4'-cyclopentathiazole)] trimethine cyanine diiodide (described in Example 3). In Fig. 2, the curve represents the sensitivity of an emulsion containing 3,3'-dimethyl-5',6'-dihydro-4'-cyclopentaoxathiazolocarbocyanine iodide (described in Example 5). In Fig. 3, the curve depicts the sensitivity of an emulsion containing 1',3-diethyl-5,6-dihydro-4-cyclopentathiazolo-2'-cyanine iodide (described in Example 6). In Fig. 4, the curve depicts the sensitivity of an emulsion containing 3-ethyl-5-[(3-ethyl-5,6-dihydro-4-cyclopenta-2(3)thiazolylidene)ethylidene] rhodanine (described in Example 8).

In the foregoing, I have described various examples of my new compositions of matter and processes of preparing the same, and the features of novelty which I believe to be characteristic of my invention are set forth with particularity in the following claims. It will be understood, however, that modifications and changes may be made, as will be clear to those skilled in the art, without departing from the spirit and substance of my invention.

What I claim as new and desire to secure by Letters Patent is:

1. A silver halide photographic emulsion containing a dye having the general formula:

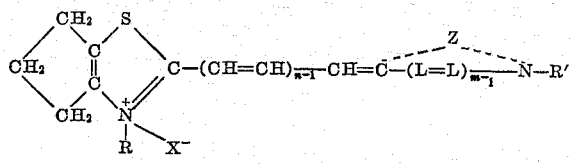

wherein R and R' respectively represent a member selected from the group consisting of alkyl and aralkyl groups, L represents a methine group, m represents a positive integer from 1 to 2, n represents a positive integer from 1 to 3, inclusive, X⁻ represents an acid radical and Z represents the non-metallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

2. A silver halide photographic emulsion containing a dye having the formula:

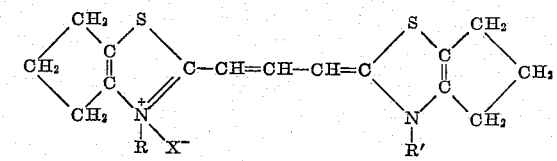

where R and R', respectively, represent a member selected from the group consisting of alkyl and aralkyl groups and X⁻ represents an acid radical.

3. A silver halide photographic emulsion containing a dye having the formula:

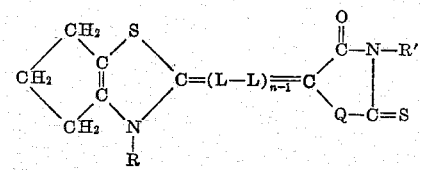

where R represents a member selected from the group consisting of alkyl and aralkyl groups and R' represents a member selected from the group consisting of alkyl, aralkyl, and aryl groups, L is a methane group, n is a positive integer from 1 to 4, both inclusive, and Q is a member selected from the group consisting of oxygen, sulfur, selenium and =N—R'.

4. A silver halide photographic emulsion containing a dye having the formula:

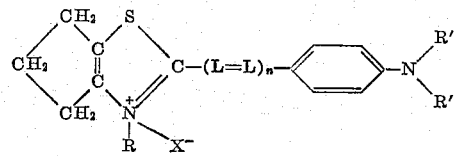

wherein R and R', respectively, represent a member selected from the group consisting of alkyl and aralkyl groups, L represents a methine group, $n$ represents a positive integer from 1 to 2 and $X^-$ represents an acid radical.

5. A silver halide photographic emulsion containing a dye having the formula:

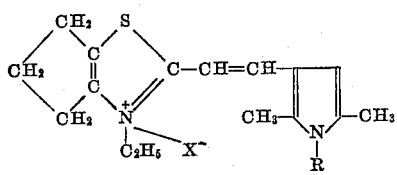

where R represents a member from the group consisting of alkyl, aralkyl and aryl groups and $X^-$ represents an acid radical.

6. A silver halide photographic emulsion containing a dye having the formula:

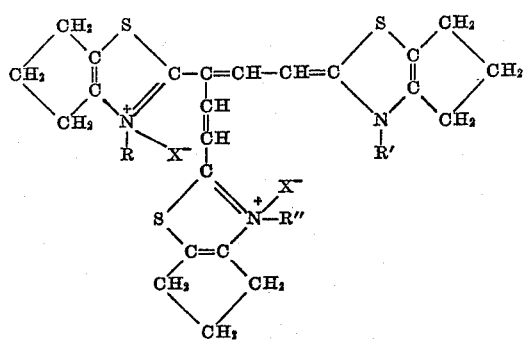

wherein R, R' and R" represent a member selected from the group consisting of alkyl and aralkyl groups and $X^-$ represents an acid radical.

7. A silver halide photographic emulsion containing as the sensitizing dye therein 3,3'-diethyl-5,5',6,6'-tetrahydro-4,4'-cyclopentathiazolocarbocyanine iodide.

8. A silver halide photographic emulsion containing a dye having the structure:

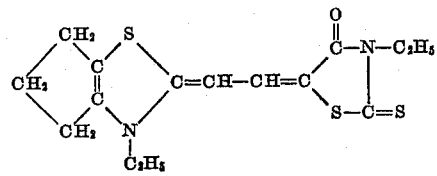

9. A silver halide photographic emulsion containing a dye having the structure:

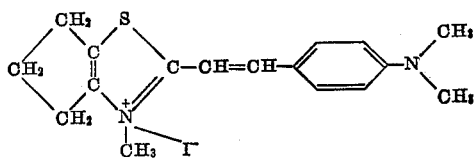

10. A silver halide photographic emulsion containing a dye having the formula:

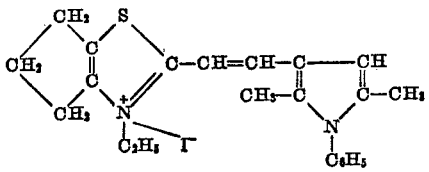

11. A silver halide emulsion containing a dye having the formula:

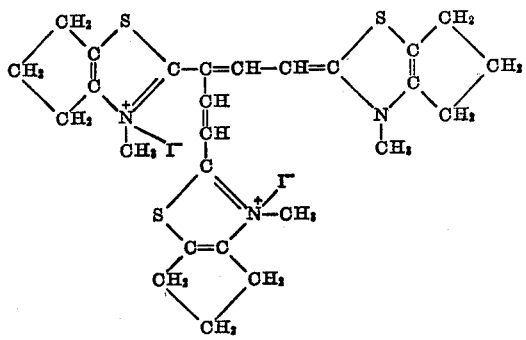

References Cited in the file of this patent
UNITED STATES PATENTS

| | | |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,330,203 | Brooker et al. | Sept. 28, 1943 |
| 2,336,463 | Brooker et al. | Dec. 14, 1943 |
| 2,336,843 | Brooker et al. | Dec. 14, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,495,260 | Jennen et al. | Jan. 24, 1950 |

OTHER REFERENCES

Chemical Abstracts, 16:3101 (copy in S.L.) (abstract of Brit. Med. Journal, 1922, I, 514–515).

Chemical Abstracts, 19:530 (copy in S.L.) (abstract of Proc. Roy. Soc., London, 96B, 317–333, 1924).